(12) United States Patent
Hori et al.

(10) Patent No.: US 7,724,625 B2
(45) Date of Patent: *May 25, 2010

(54) OPTICAL DISK APPARATUS AND DATA REPRODUCING METHOD

(75) Inventors: Hiroyuki Hori, Tokyo (JP); Hisataka Sugiyama, Kodaira (JP); Masanori Matsuzaki, Mito (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/016,414

(22) Filed: Jan. 18, 2008

(65) Prior Publication Data

US 2008/0112290 A1    May 15, 2008

Related U.S. Application Data

(63) Continuation of application No. 10/902,676, filed on Jul. 28, 2004, now Pat. No. 7,339,870.

(30) Foreign Application Priority Data

Dec. 25, 2003   (JP) .............................. 2003-428634

(51) Int. Cl.
  *G11B 7/00*  (2006.01)
(52) U.S. Cl. .................................... 369/53.27; 369/116
(58) Field of Classification Search .............. 369/53.27, 369/53.16, 116
See application file for complete search history.

(56) References Cited

U.S. PATENT DOCUMENTS

| 4,785,295 A | 11/1988 | Fukui et al. |
| 5,471,449 A | 11/1995 | Kaneko et al. |
| 6,215,741 B1 | 4/2001 | Ishiduka |
| 7,020,385 B2 | 3/2006 | Ishibashi |
| 7,339,870 B2 * | 3/2008 | Hori et al. ................ 369/53.27 |
| 2004/0062164 A1 * | 4/2004 | Miyamoto et al. ....... 369/53.26 |
| 2005/0030846 A1 * | 2/2005 | Kono ...................... 369/44.27 |

FOREIGN PATENT DOCUMENTS

| JP | 02-010524 A | 1/1990 |
| JP | 02-287141 A | 11/1990 |
| JP | 07-141702 A | 6/1995 |
| JP | 09-326120 A | 12/1997 |

* cited by examiner

*Primary Examiner*—Thang V Tran
(74) *Attorney, Agent, or Firm*—Townsend and Townsend and Crew LLP

(57) ABSTRACT

When the data is reproduced by irradiating a laser beam onto the optical disk, an amount-of-irradiation-beam detection signal is produced according to the amount of the laser beam irradiated onto the optical disk, and the defect on the optical disk is detected on the basis of this amount-of-irradiation-beam detection signal. In addition, when the data is reproduced by irradiating the laser beam onto the optical disk, the amount-of-irradiation-beam detection signal is produced according to the amount of the laser beam irradiated onto the optical disk, an amount-of-reflected-beam detection signal is produced in accordance with the amount of the laser beam reflected from the optical disk, and the defect on the optical disk is detected on the basis of the amount-of-irradiation-beam detection signal and the amount-of-reflected-beam detection signal. Even when the optical disk has a defect, the laser beam is continuously irradiated onto the optical disk.

8 Claims, 9 Drawing Sheets

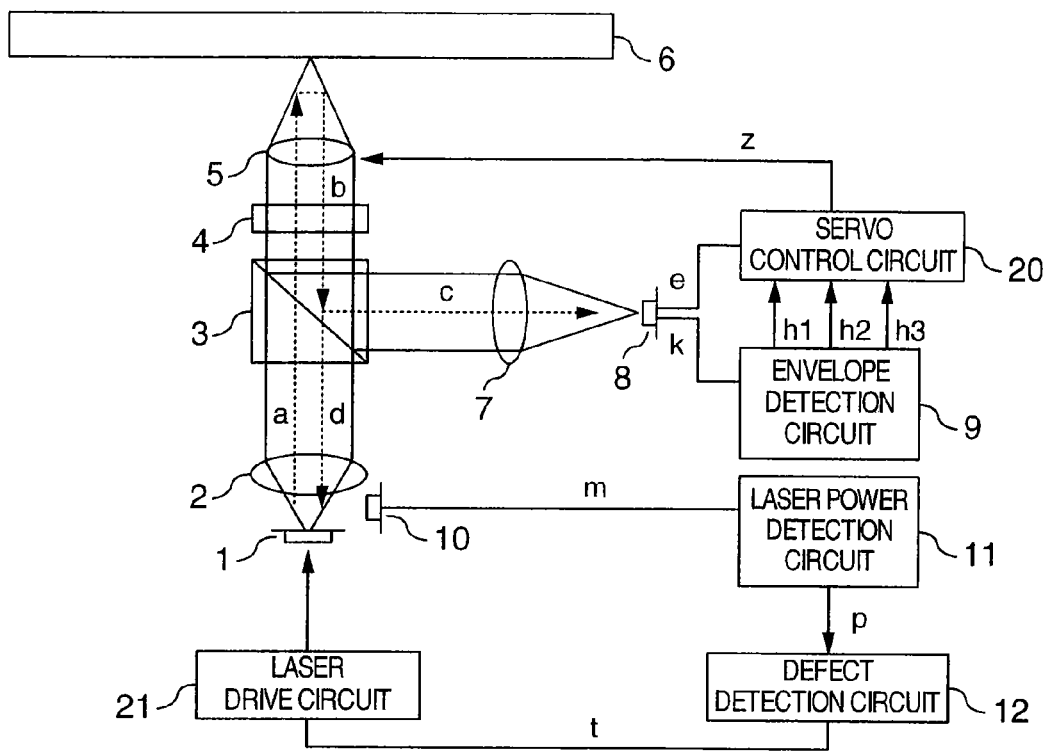
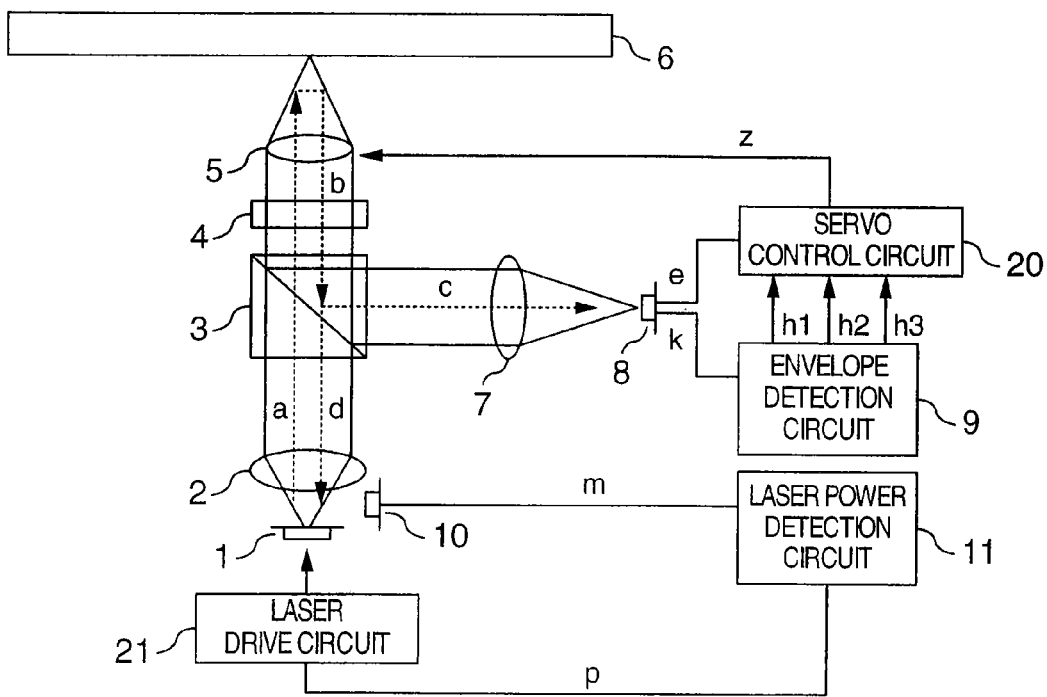

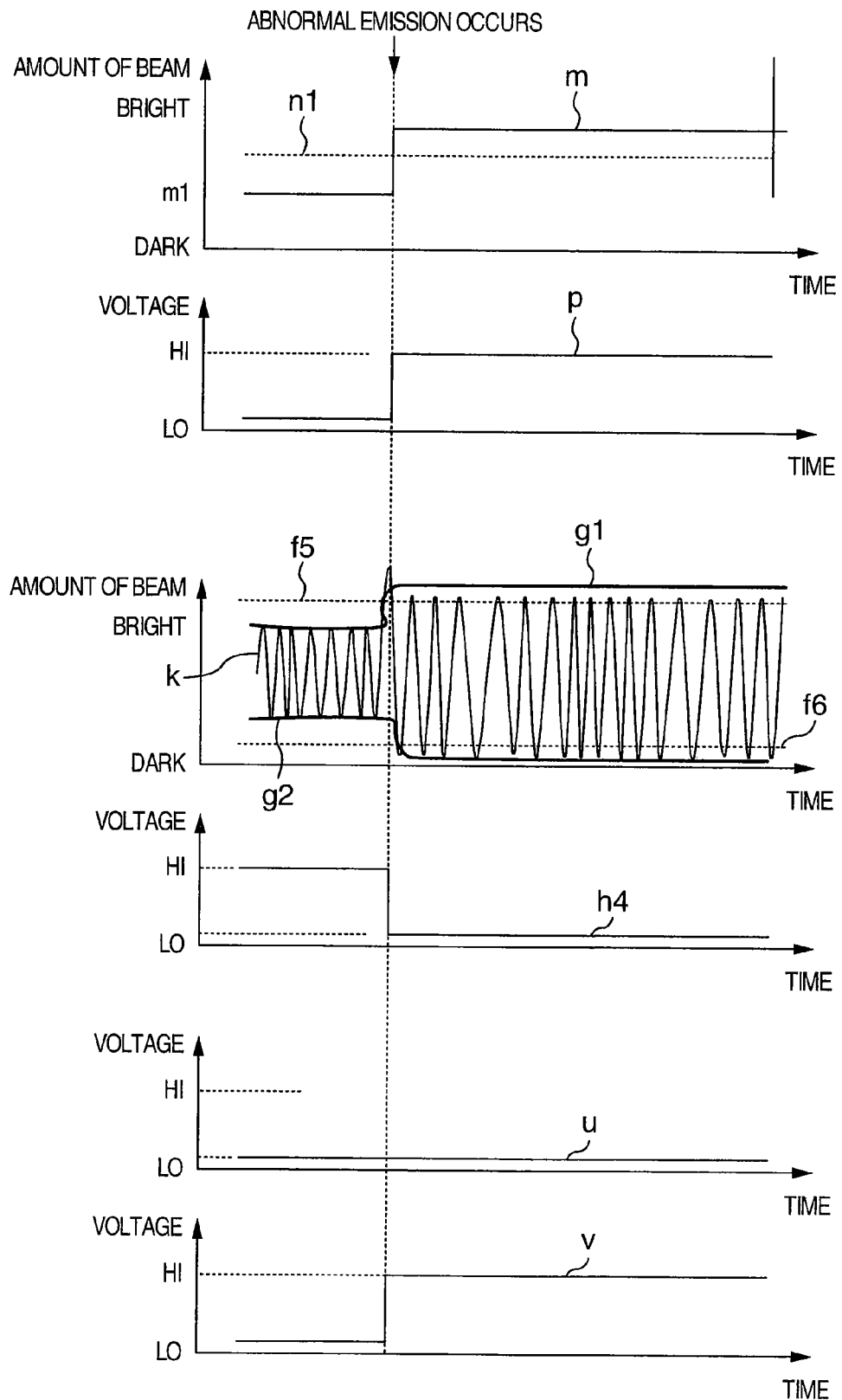

OPTICAL DISK APPARATUS AND DATA REPRODUCING METHOD

CROSS-REFERENCE TO RELATED APPLICATION(S)

This is a continuation of U.S. patent application Ser. No. 10/902,676, filed Jul. 28, 2004, which application claims priority from Japan Patent Application No. JP 2003-428634 filed on Dec. 12, 2003, the entire disclosure of which is incorporated herein by reference.

BACKGROUND OF THE INVENTION

1. Field of the Invention

This invention generally relates to data reproducing techniques, and particularly to a technique capable of stably reproducing data with being less subject to the defects of optical disks.

2. Description of the Prior Art

The construction and operation of a conventional optical disk apparatus will be described first with reference to FIGS. 2 through 6. FIG. 2 shows the construction of part of a conventional optical disk apparatus. FIG. 3A shows the action of a polarizing beam splitter 3 on an inputted laser beam a1, and FIG. 3B shows the action of the polarizing beam splitter 3 on an inputted laser beam b1. FIG. 4A shows the action of a quarter wave plate 4 on the inputted laser beam a1, and FIG. 4B shows the action of the quarter wave plate 4 on the inputted laser beam b1. FIG. 5A shows a method of detecting a bright defect by an envelope detection circuit 9, FIG. 5B a method of detecting a dark defect by the envelope detection circuit 9, and FIG. 5C a method of detecting an amplitude reduction by the envelope detection circuit 9. FIG. 6 shows a method of detecting an abnormal laser-beam emission by a laser power detection circuit 11.

Referring to FIG. 2, there are shown a laser-beam source 1, a collimator lens 2, the polarizing beam splitter 3, the quarter wave plate 4, an objective lens 5, an optical disk 6, a convex lens 7, a reproducing photo detector 8, the envelope detection circuit 9, an irradiation beam photo detector 10, the laser power detection circuit 11, a servo control circuit 20 and a laser drive circuit 21.

The polarizing beam splitter 3 shown in FIG. 2 has two prisms glued slant-face to slant-face with one of their slant faces coated with a polarizing film to form a cube. This splitter 3 acts so that it allows the beam component a1 (P-polarized component) parallel to the x-axis to pass through it as illustrated in FIG. 3A, and that it allows the beam component b1 (S-polarized component) parallel to the y-axis to be reflected as a beam component c1 as illustrated in FIG. 3B. The quarter wave plate 4 acts so that it converts the beam component a1 (P-polarized component) parallel to the x-axis into a circular-polarized beam component a2 as shown in FIG. 4A, and that it converts a circular-polarized beam component b2 into the beam component b/(S-polarized component) parallel to the y-axis as shown in FIG. 4B.

The laser drive circuit 20 drives the laser-beam source 1 to irradiate the laser beam a toward the optical disk 6. The laser beam a irradiated from the laser-beam source 1 is converted into a parallel pencil of rays (parallel beam) by the collimator lens 2. Since the laser beam a irradiated from the laser-beam source 1 through the collimator lens 2 is the P-polarized component, the polarizing beam splitter 3 allows this inputted beam to pass as it is. The quarter wave plate 4 converts the incident laser beam a from the polarizing beam splitter 3 into a circular-polarized beam. The circular-polarized laser beam a from the quarter wave plate 4 is focused to hit the rotating optical disk 6 by the objective lens 5.

The laser beam b reflected from the rotating optical disk 6 is collected by the objective lens 5 and is again incident to the quarter wave plate 4. The circular-polarized laser beam b incident to the quarter wave plate 4 is converted into the S-polarized component that is perpendicular to the laser beam a irradiated from the laser-beam source 1. The S-polarized component b is fed to the polarizing beam splitter 3. Since the polarizing beam splitter 3 acts to reflect the S-polarized component as described above, the laser beam b is almost reflected from the polarizing beam splitter 3 into the convex lens 7 as a laser beam c. This laser beam c is fed through the convex lens 7 to the surface of the reproducing photo detector 8. The rest of the beam b is passed as a beam d through the collimator lens 2 and incident to the laser-beam source 1.

The reproducing photo detector 8 is composed of a plurality of light-sensitive elements and an arithmetic circuit. The arithmetic circuit computes the amounts of beam received by those respective light-sensitive elements, and produces a servo error signal e according to the focus position and tracking position of the laser beam a irradiated on the optical disk 6, and a reflected-beam detection signal k according to the absolute amount of the reflected beam. The reflected-beam detection signal k is supplied to a signal processing circuit not shown, where it is processed according to a certain method so that data can be reproduced.

A servo control signal z produced from the servo control circuit 20 can control the objective lens 5 to drive so that the inputted servo error signal e can always be kept at a predetermined value, thus adjusting the focus position and tracking position of the laser beam a. However, when the optical disk 6 has a defect, the servo error signal e changes even when the above focus position and tracking position are optimum. At this time, when the servo control circuit 20 erroneously operates by trying to change the servo error signal e into a certain value, a long time will be sometimes taken until the servo control circuit returns to the normal controlling state even when the spot of the laser beam a crosses over the defect of the optical disk 6 and then scans the correct area of the disk. Therefore, the data will be interrupted when it is reproduced by the above signal processing circuit.

Meanwhile, the envelope detection circuit 9 detects the envelope of the reflected-beam detection signal k fed at its input end and uses slice levels of f1, f2, f3 and f4 as, for example, shown in FIG. 5 to detect the amplitude reduction of the signal k due to the bright defect, dark defect and contamination that occur on the optical disk 6.

In FIGS. 5A through 5C, the abscissas are the time, and the ordinates are the signal k as the amount of the reflected beam and the output signals h1, h2 and h3 produced from the envelope detection circuit 9. In the case of bright defect, the amount of the reflected beam is increased over the normal value because the reflecting film is, for example, exposed at the area where the evaporation on the recording surface of optical disk 6 is inadequate.

The slice level f1 for detecting the bright defect is set at an arbitrary position relative to the upper envelope g1 of the signal k as shown in FIG. 5A. When the upper envelope g1 and the lower envelope g2 exceed the slice level f1 at the bright defect j1, the output signal h1 takes a voltage of H1.

In the case of dark defect, the amount of the reflected beam is decreased to be less than the normal value because dust particles or the like that block the beam are, for example, attached on the surface of optical disk 6.

The slice level f2 is set at an arbitrary position relative to the lower envelope g2 of the signal k as shown in FIG. 5B. When the upper envelope g1 and lower envelope g2 are decreased less than the slice level f2 at the dark defect j2, the output signal h2 takes a voltage of H1.

In the rewritable-type optical disk such as CD-RW, the amplitude of the signal k produced from the detector 8 when the disk is recorded or reproduced is reduced, for example, due to the semitransparent dust attached to the surface of disk 6. The slice levels f3 and f4 for detecting the amplitude reduction are set at arbitrary positions between the upper envelope g1 and the lower envelope g2 as shown in FIG. 5C. The output signal h3 takes a voltage of H1 when the upper envelope g1 and lower envelope g2 are changed to have values between these slice levels g1, g2 at the amplitude-reduction time interval j3 due to the dust on the disk 6. Therefore, when the defects are detected, the servo error signal e is masked by using the above the output signals h1, h2 and h3 to hold the servo control circuit 20 in the off state, thereby preventing the above erroneous operation from being caused due to the above defects.

On the other hand, the irradiation beam photo detector 10 is composed of a beam-sensitive element and an amplifying circuit. This detector 10 receives part of the laser beam a emitted from the laser-beam source 1 and produces an amount-of-irradiation-beam detection signal m according to the amount of the received beam. The laser power detection circuit 11 detects an abnormal beam emission of the laser-beam source 1 in accordance with the inputted signal m as shown in FIG. 6.

In FIG. 6, the abscissas are the time, and the ordinates are the signal m as the amount of part of the beam a and the voltage of an output signal p from the laser power detection circuit 11. In the laser power detection circuit 11, a slice level n1 for detecting the abnormal emission of the laser-beam source 1 is set above the normal beam detection level m1 that is produced when the inputted signal m is reproduced. When the signal m increases over the slice level n1, the output signal p from the laser power circuit 11 takes a voltage of H1 to stop the beam emission of the laser-beam source 1. Thus, the recorded data on the disk can be prevented from being damaged by the abnormal beam emission of the laser-beam source 1 that occurs chiefly in the RW-type optical disk.

In the detection of defects on the disk, it is necessary to stably detect without detecting errors. In this prior art, there is a technique in which the reproducing photo detector 8 is used to more precisely detect the defects by changing the slice levels for the defects in accordance with the variation of the DC component of the amount of the reflected beam (for example, see JP-A-07-141702)

When the optical disk 6 is made of, for example, a polycarbonate resin material by injection molding, the optical disk 6 has, sometimes, distortion left, thus becoming optically anisotropic so that the defects to cause retardation of light are locally formed on the disk. At the retardation defect, the laser beam a makes retardation when being reflected from the disk 6. Thus, the laser beam b again incident to the polarizing beam splitter 3 through the quarter wave plate 4 has much P-polarized component (about 20%) left. Consequently, the P-polarized component of laser beam b is directly passed through the collimator lens 2, so that the amount of laser beam d fed back to the laser-beam source 1 increases.

The operation that the optical disk apparatus makes at this time will be described with reference to FIG. 12. In FIG. 12, the abscissas are the time, and the ordinates are the signal m, the output voltage p from the laser power detection circuit 11 and the signal k as the amount of the reflected beam. At the retardation defect j4, the amount of laser beam c detected by the reproducing photo detector 8 includes the reduction of S-polarized component due to the retardation and the increase of the emission level of laser-beam source 1 due to the optical resonance action of the laser beam d. Thus, the signal m is almost not changed even when the spot of the laser beam a crosses over the defect j4.

In the optical disk apparatus, the amount of reflected beam to the reproducing photo detector 8 is normally changed about 20~30% when the beam scans the correct areas of the optical disk. Thus, in the prior art of the above document in which the detector 8 is used to more precisely detect the defects, it is difficult to detect slight variations of the amount of the reflected beam due to the retardation defect.

The laser beam b having the P-polarized component left due to the retardation defect passes through the polarizing beam splitter 3 to be left as laser beam d. This laser beam d causes the optical resonance action to greatly change the emission level of the laser-beam source 1. The signal m of usually about 1 mW is actually changed to a level of about 2 mW. Thus, the signal m from the irradiation beam photo detector 10 changes. Since the laser power detection circuit 11 often has an abnormal emission slice level n1 of about 1.5 mW set relative to the signal m of about 1 mW, the detector 11 detects this interval as the abnormal emission, thus producing the output signal p of H1 voltage by which the laser drive circuit 21 is controlled to stop the beam emission of the laser-beam source 1.

Once the laser-beam source 1 stops the emission, it takes a long time for the laser-beam source 1 to restart the beam emission and for the servo control circuit 20 to control the focus position and tracking position of the laser beam a3 so that the reproducible mode can be again brought about. Therefore, when the defects including the above retardation defect occur many times on the same optical disk, the reproduction of data is interrupted. Particularly when a time-series reproduction is performed as in the process for reproducing a stream of image files, the image that is being reproduced is aborted.

In other words, since the above reproducing photo detector 8 cannot detect the retardation defect, it is difficult to prevent the laser-beam source 1 from being stopped, and thus the signal processing for the data is aborted.

It is an object of the invention to provide an information reproducing technique capable of making stable data reproduction even when the optical disk has defects that hardly cause the amount of reflected beam to change.

In order to achieve the above object, according to the invention, when the laser beam is irradiated onto the disk to reproduce the data from the disk, an amount-of-irradiation-beam detection signal is produced according to the amount of the laser beam irradiated onto the optical disk, and the defects on the disk are detected on the basis of this amount-of-irradiation-beam detection signal.

In addition, according to this invention, when the laser beam is irradiated onto the disk to reproduce the data from the disk, an amount-of-irradiation-beam detection signal is produced according to the amount of the laser beam irradiated onto the optical disk, an amount-of-reflected-beam detection signal is produced according to the amount of the laser beam reflected from the optical disk, and the defects on the disk are detected on the basis of these amount-of-irradiation-beam detection signal and amount-of-reflected-beam detection signal.

Then, even when the optical disk has a defect, the laser beam is continued to irradiate onto the optical disk.

According to this invention, even when the optical disk has a defect that hardly causes the amount of reflected beam to change, the data on the disk can be stably reproduced.

Other objects, features and advantages of the invention will become apparent from the following description of the embodiments of the invention taken in conjunction with the accompanying drawings.

BRIEF DESCRIPTION OF THE DRAWINGS

FIG. 1 is a diagram showing the construction of an optical disk apparatus of a first embodiment according to this invention.

FIG. 2 is a diagram showing the construction of a conventional optical disk apparatus.

FIG. 11B is a diagram showing the operation of the defect detection circuit 18 to detect the abnormal beam emission.

DESCRIPTION OF THE EMBODIMENTS

Embodiments of the invention will be described with reference to the accompanying drawings.

The optical disk apparatus of the first embodiment according to this invention will be mentioned with reference to FIG. 1, FIG. 7 and FIGS. 8A and 8B. FIG. 1 is a diagram showing the construction of the optical disk apparatus of the first embodiment according to the invention. As illustrated in FIG. 1, the defect detection circuit 12 is added as a subsequent stage of the irradiation beam photo detector 10 to the construction of the conventional optical disk apparatus shown in FIG. 2. In this embodiment, only the operation different from that of the optical disk apparatus shown in FIG. 2 will be mentioned in order to avoid redundancy.

Figure 3A:
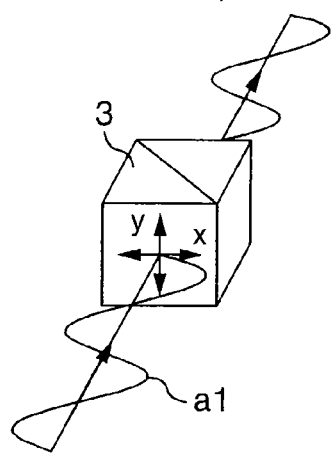
FIGS. 3A and 3B are diagrams showing the action of the polarizing beam splitter 3 on the incident laser beam.
Figure 3B:
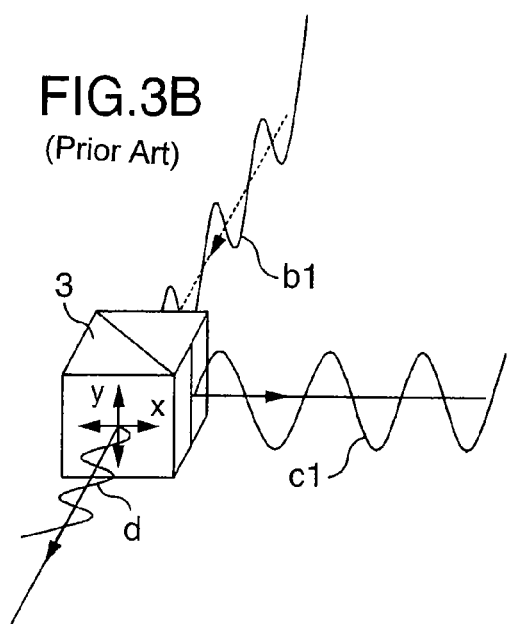
Figure 4A:
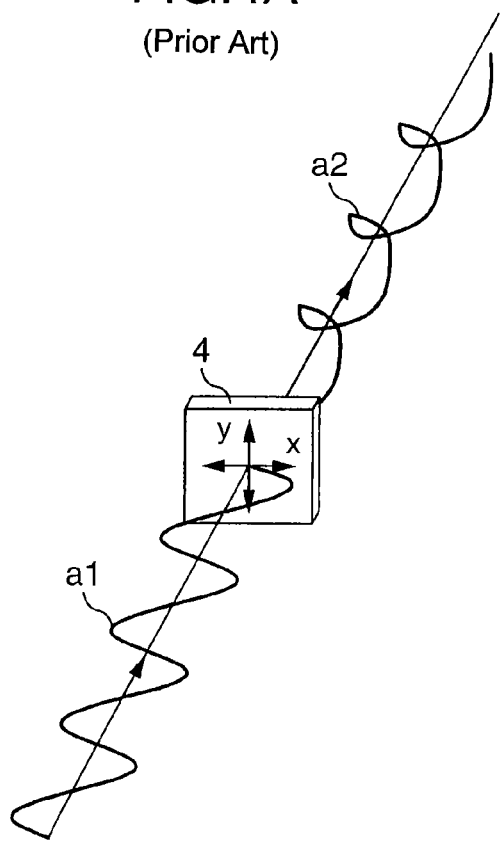
FIGS. 4A and 4B are diagrams showing the action of the quarter wave plate 4 on the incident laser beam.
Figure 4B:
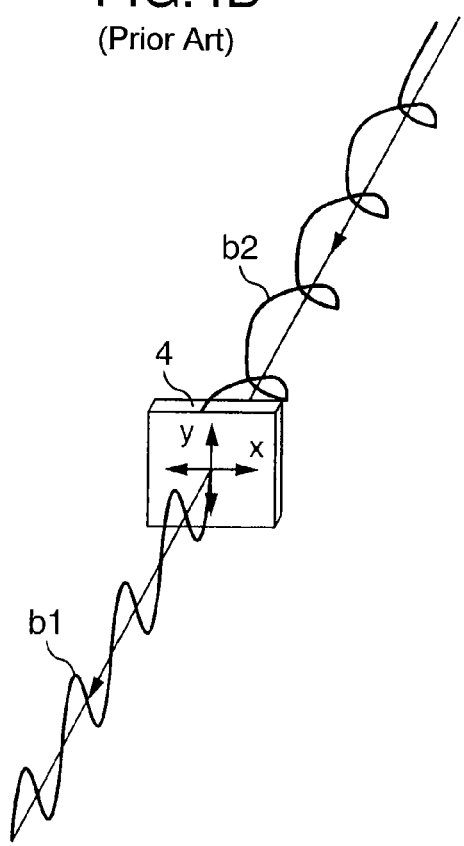
Figure 5A:
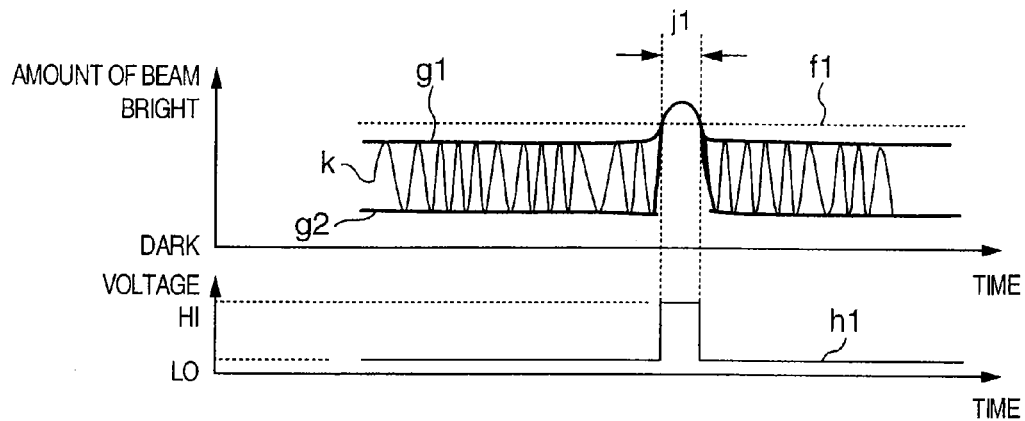
FIGS. 5A through 5C are diagrams showing a method of detecting defects on the optical disk by using the envelope detection circuit 9.
Figure 5B:
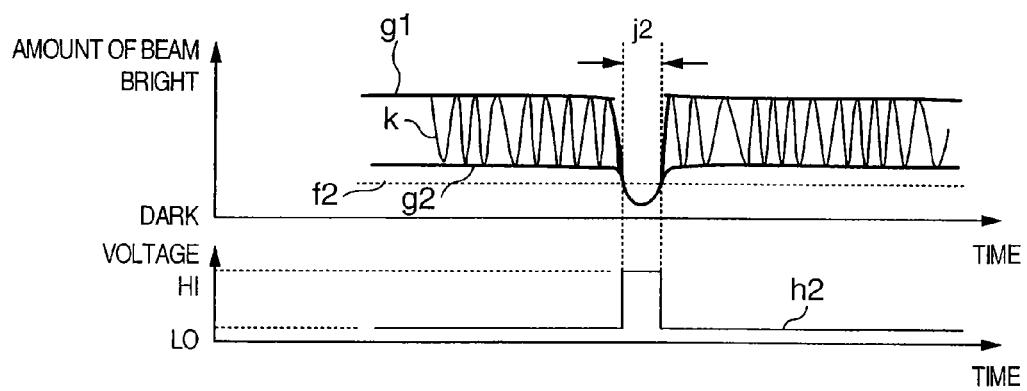
Figure 5C:
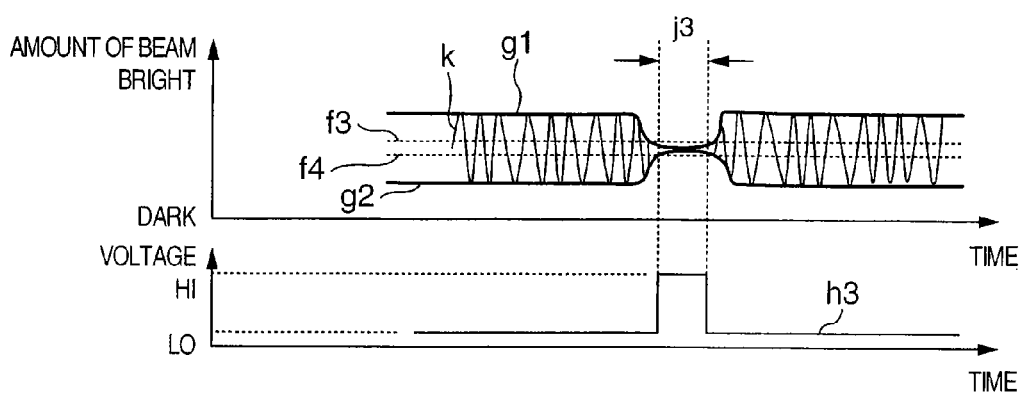
Figure 6:
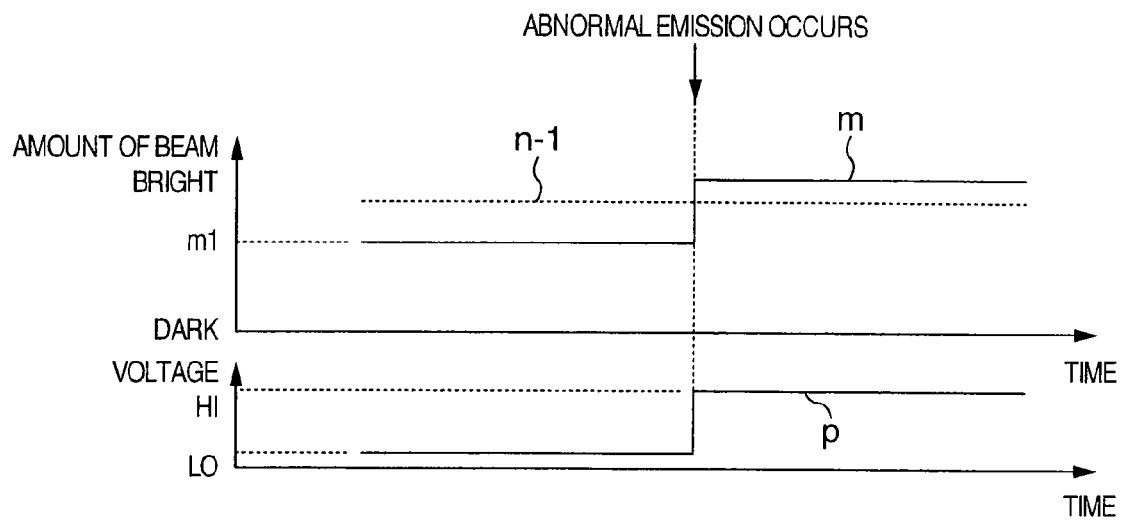
FIG. 6 is a diagram showing a method of detecting the abnormal beam emission by the laser power detection circuit 11.
Figure 7:
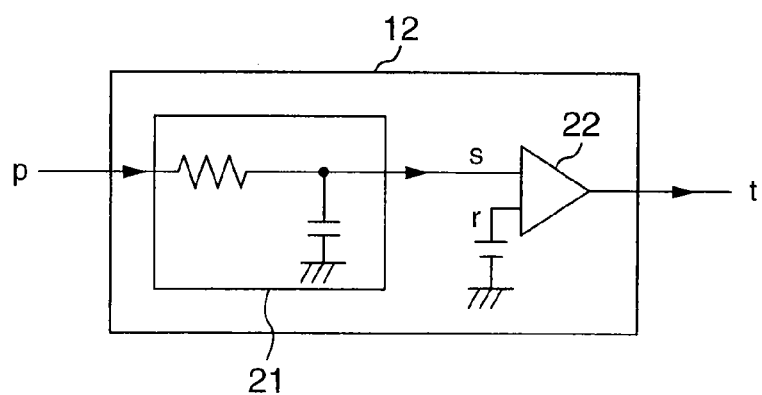
FIG. 7 is a diagram showing an example of the construction of a defect detection circuit 12.
Figure 8A:
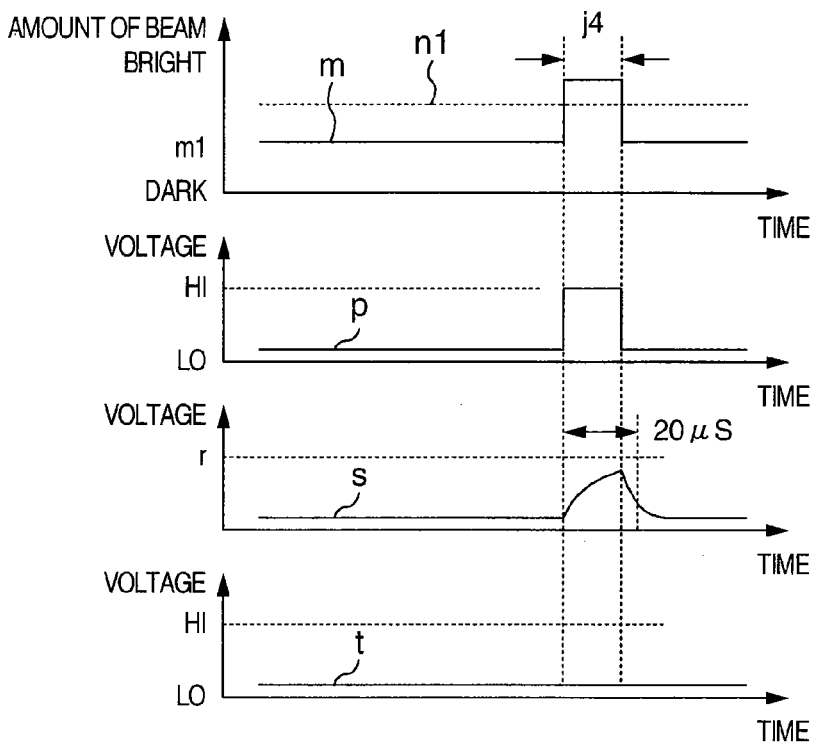
FIGS. 8A and 8B are diagrams showing the operation of the defect detection circuit 12.
Figure 8B:
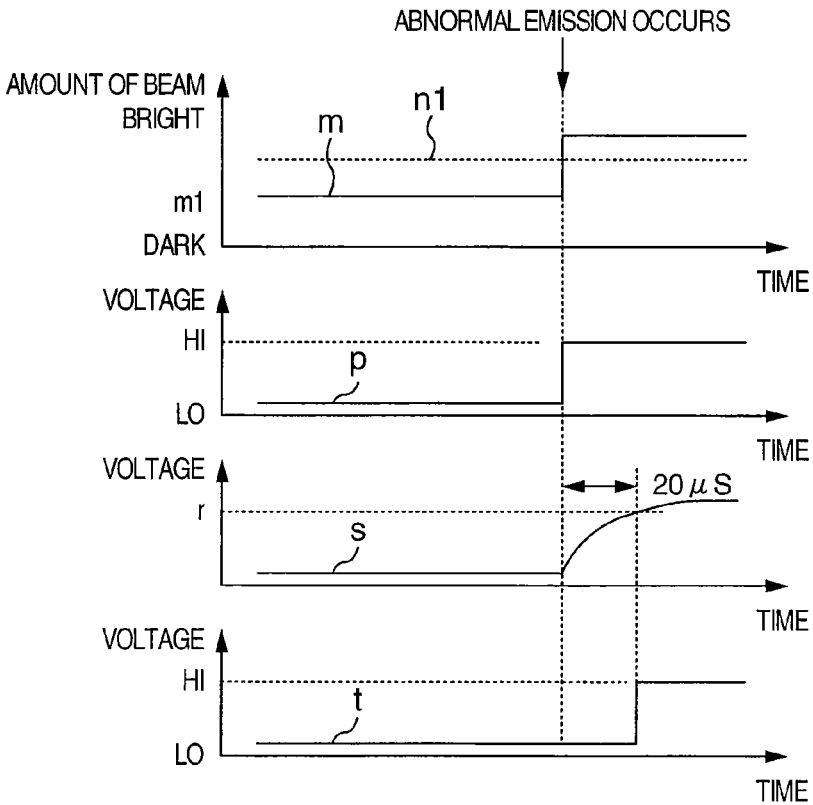

FIG. 7 shows the construction of the defect detection circuit 12. The defect detection circuit 12 is formed of, for example, a low-pass filter 21 having a resister and a capacitor, and a comparator 22. FIGS. 8A and 8B show the signal processing that the defect detection circuit 12 makes. In FIGS. 8A and 8B, the abscissas are the time, and the ordinates are the signal m as the amount of received part of the laser beam a, the output signal p from the laser power detection circuit 11, the output signal s from the low-pass filter 21, and the output signal t from the comparator 22.

When a retardation defect occurs on the disk, this construction operates as in FIG. 8A. In other words, at the retardation defect j4, the irradiation beam photo detector 10 produces the signal m of a larger output, or about 2 mW than the normal output of 1 mW. The laser power detection circuit 11 has set therein the abnormal beam emission slice level n1 of 1.5-mW equivalent, and thus produces the output signal p of H1 voltage during the interval j4. In the defect detection circuit 12, the time constant of low-pass filter 21 and the reference voltage r of comparator 22 are properly designed not to change its output during a predetermined time of about 20 □S against the applied rising edge and trailing edge of the output signal p from the laser power detection circuit 11 because most of the retardation defects correspond to the duration of less than 20 □S. Therefore, at the retardation defect j4, since the output s from the low-pass filter 21 does not reach the reference voltage r, the output signal t from the defect detection circuit 12 stays at LO voltage. Consequently, the laser drive circuit 21 continues to drive the laser-beam source 1, so that the laser-beam source 1 can be prevented from being stopped at the retardation defect. The duration of the retardation defect stands for the duration measured when the optical disk 6 of DVD (Digital Versatile Disk) is rotated at double normal reproduction speed. The physical length of this defect is about 0.2 mm. Since the duration of the retardation defect depends on the kind of optical disk and the reproduction speed, the duration should be properly adjusted according to the kind of optical disk and the reproduction speed.

Meanwhile, the abnormal beam emission is caused by the abnormal operation of chiefly the signal processing circuit and the laser drive circuit for driving the laser-beam source 1. In almost all cases, the abnormal beam emission has duration of more than 20 □S once it occurs. Therefore, when abnormal beam emission over 1.5 mW occurs, the output signal s from the low-pass filter 21 increases to more than the reference voltage r at the time when the lapse of time exceeds 20 □S, and thus the comparator 22 produces output signal t of H1 voltage as shown in FIG. 8B. Then, the laser drive circuit 21 controls the laser-beam source 1 to stop its beam emission in response to this H1 voltage.

In other words, as described above, this embodiment uses the change of the signal m from the irradiation beam photo detector 10 in such a manner that the beam emission from the laser-beam source 1 can be switched on and off in accordance with the time during which the signal m changes. Thus, it is possible to precisely detect the retardation defect that has so far been difficult to detect in the reproducing photo detector 8. Accordingly, when the output signal t from the defect detection circuit 12 is used as a laser stop signal to control the laser drive circuit, the laser-beam source 1 does not stop its emission at the retardation defect but can stop its emission 20 □S after abnormal emission occurs. When the deflect level on the optical disk of, for example, DVD is less than 20 □S within 1 ECC block, the signal processing circuit can usually make error correction on the reproduced data, and thus any problem with reproduction performance does not occur in the unlikely event that the data is destroyed by the above 20-□S duration abnormal emission.

Even when the retardation defect often occurs, the above construction does not stop the emission of laser-beam source 1, and thus the data can be stably reproduced. Particularly when data is reproduced in a time-series manner as in the reproduction of a stream of image files, the reproduced image becomes hard to interrupt.

Figure 9:
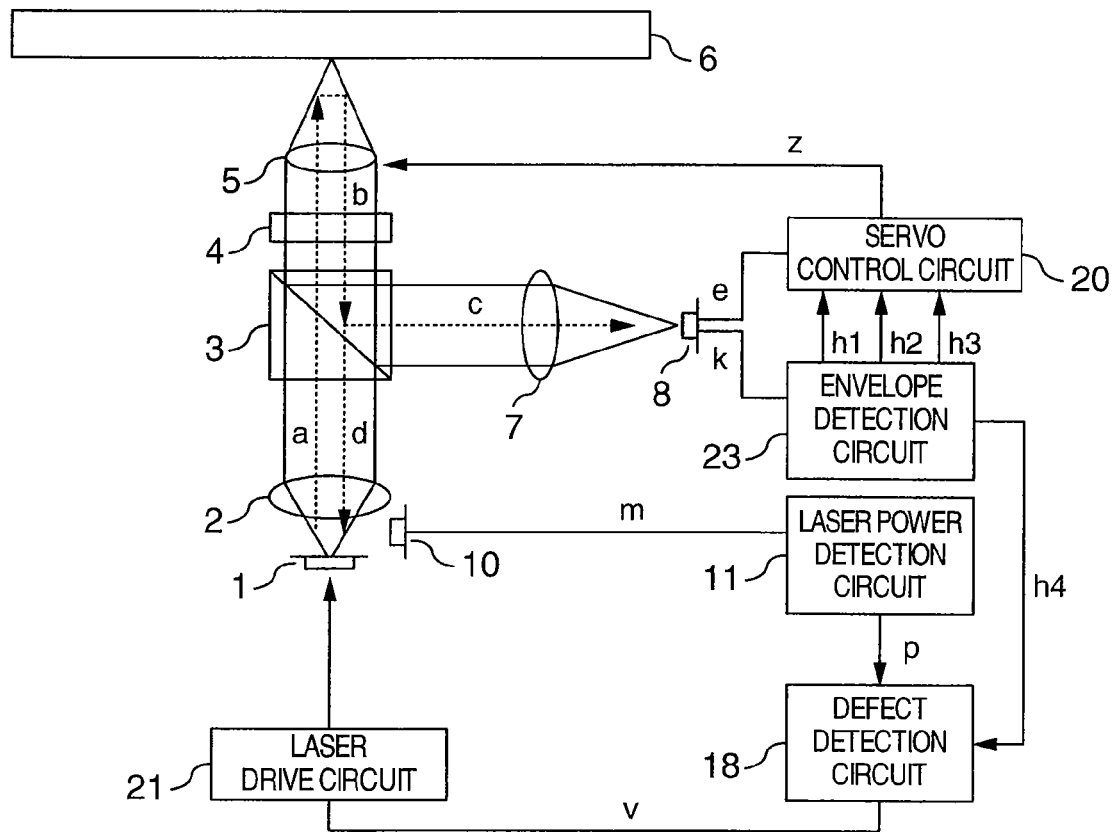
FIG. 9 is a diagram showing the construction of an optical disk apparatus of a second embodiment according to the invention.

The construction and operation of an optical disk apparatus of the second embodiment according to this invention will be described with reference to FIGS. 9 and 10 and FIGS. 11A and 11B. FIG. 9 shows the construction of the optical disk apparatus of the second embodiment according to the invention. As to this embodiment, too, only the operation different from that of the optical disk apparatus shown in FIG. 2 will be mentioned in order to avoid redundancy.

Figure 10:
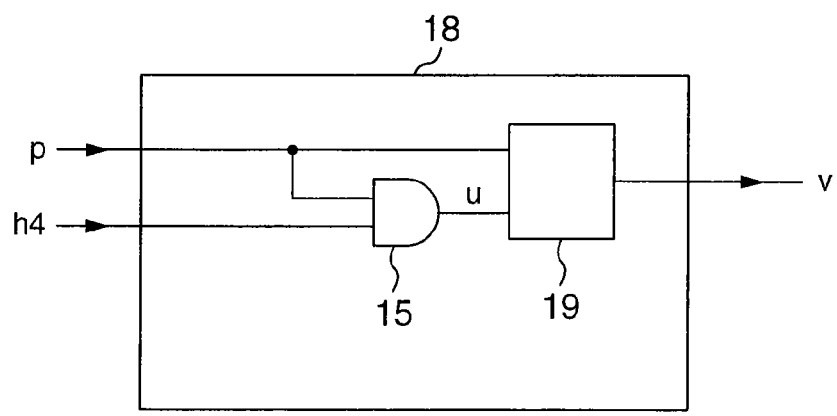
FIG. 10 is a diagram showing an example of the construction of a defect detection circuit 18.
Figure 11A:
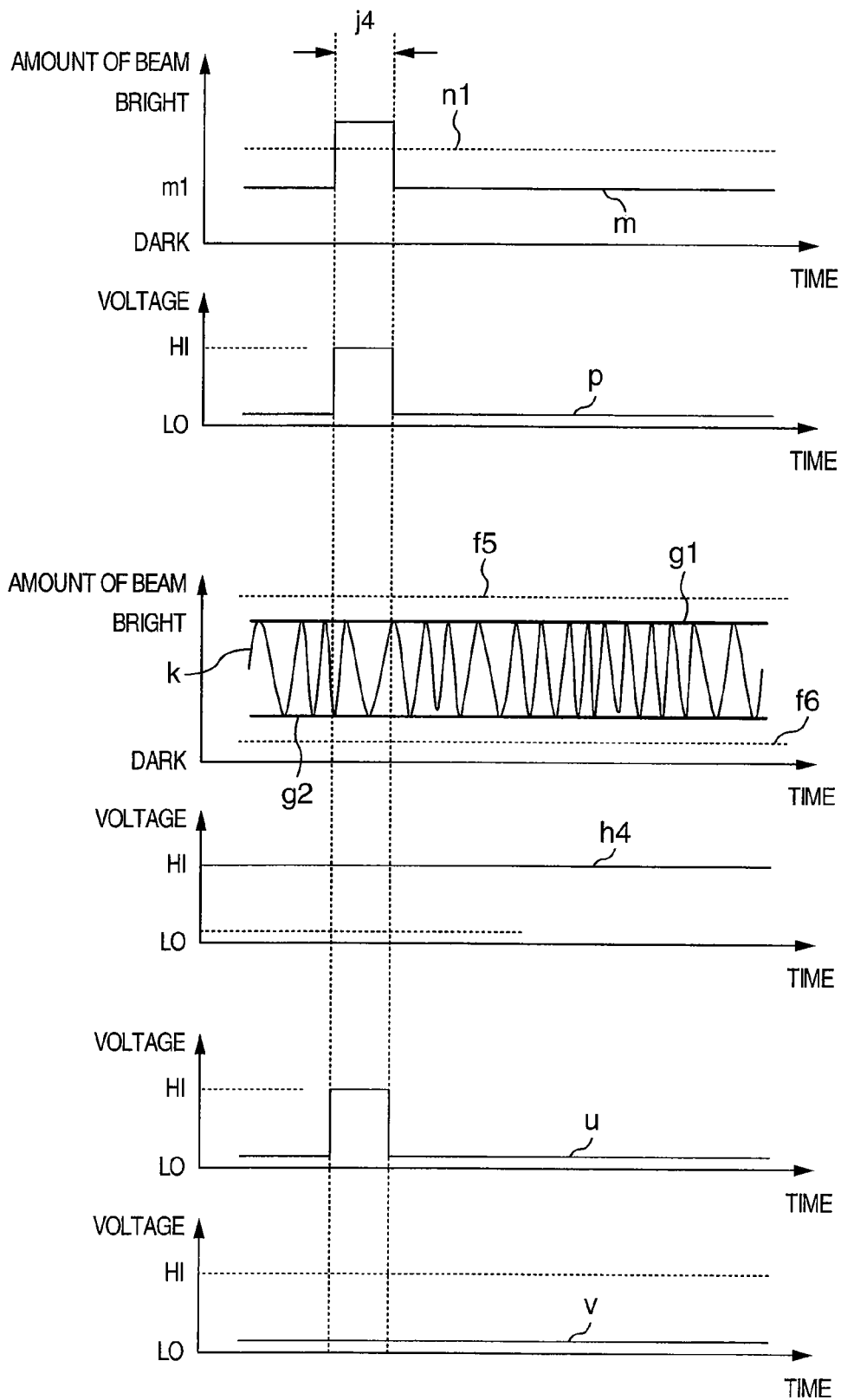
FIG. 11A is a diagram showing the operation of the defect detection circuit 18 to detect the retardation defect.
Figure 12:
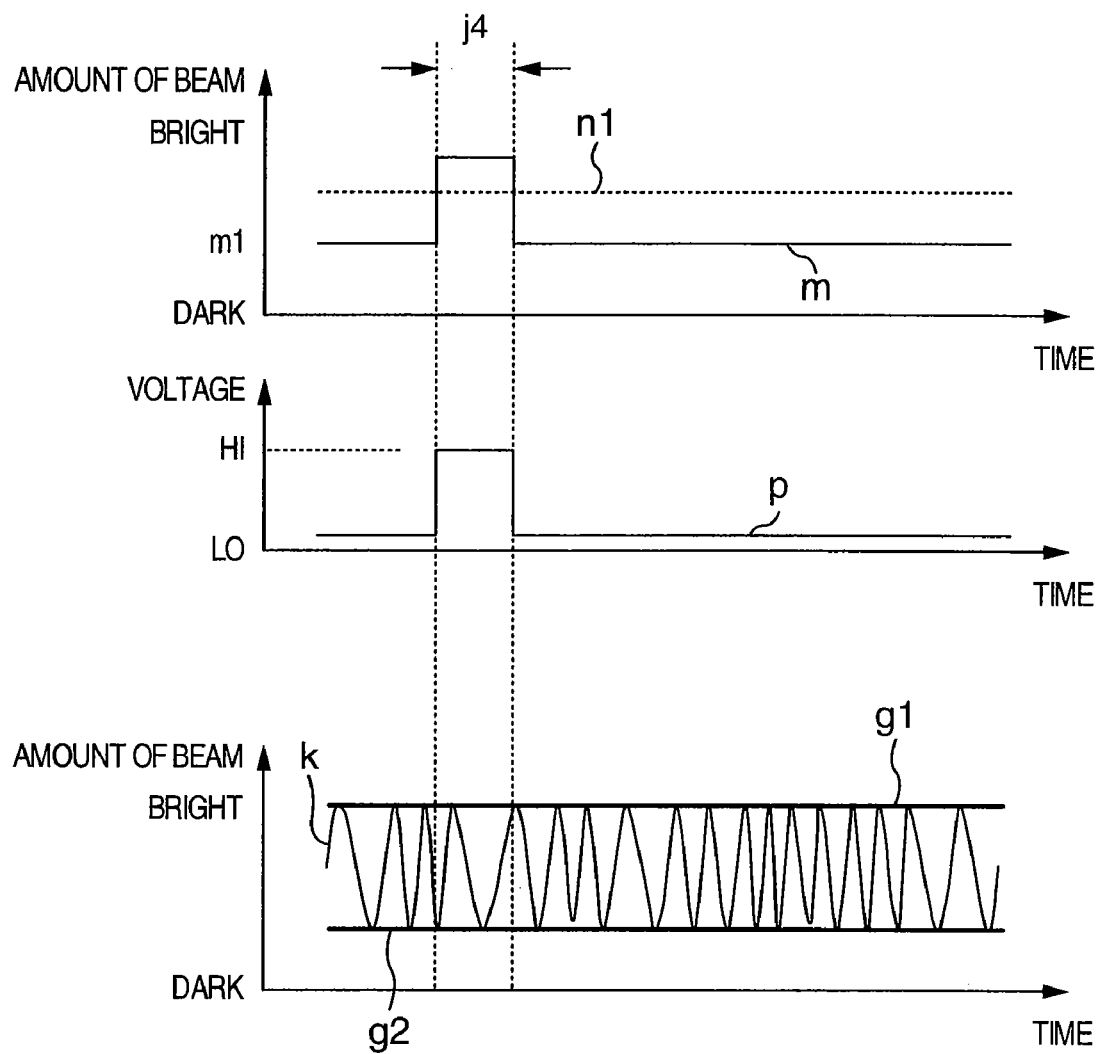
FIG. 12 is a diagram showing the operation of the envelope detection circuit 9 and laser power detection circuit 11 on the retardation defect.

Referring to FIG. 9, there are shown a defect detection circuit 18, and an envelope detection circuit 23. FIG. 10 shows the construction of the defect detection circuit 18. In FIG. 10, there are shown an AND circuit 15 and a masking circuit 19. FIG. 11A shows the signal waveforms produced from the envelope detection circuit 23 and defect detection circuit 18 when the retardation defect j4 occurs, and FIG. 11B shows the signal waveforms produced from those circuits when the abnormal emission of laser-beam source 1 occurs. In FIGS. 11A and 11B, the abscissas are the time, and the ordinates are, in descending order, the signal m as the amount of received part of the laser beam a, the voltage of output signal p from the laser power detection circuit 11, the signal k as the amount of reflected beam detected by the reproducing photo detector 8, the voltage of output signal h4 from the envelope detection circuit 23, the voltage of output signal u from the AND circuit 15 and the voltage of output signal v from the masking circuit 19.

When the retardation defect occurs as at the retardation defect j4, the signal m from the irradiation beam photo detector 10 increases as a larger output of about 2 mW than the normal 1 mW as shown in FIG. 11A. Since the laser power detection circuit 11 has set therein the abnormal emission slice level n1 of 1.5-mW equivalent, it produces the output p of H1 voltage in the interval of the defect j4.

The envelope detection circuit 23 has amplitude-increase detection slice levels f5 and f6 newly set therein to be positioned about 40% above each of the upper envelope g1 and lower envelope g2 unlike the case of the envelope detection circuit 9. Since the upper envelope g1 and lower envelope g2 of the signal k are normally positioned between these slice levels, the envelope detection circuit 23 produces the output signal h4 of H1 voltage. When the signal k is increased in its amplitude to exceed these predetermined values, the envelope detection circuit 23 produces output signal of LO voltage.

Therefore, since the amount of the laser beam c to be detected by the reproducing photo detector 8 is almost not changed at the retardation defect as described above, the output signal h4 stays at H1 voltage. The AND circuit 15 takes the product of the output p from the laser power detection circuit 11 and the output signal h4 from the envelope detection circuit 23, and produces the output signal u. The masking circuit 19 always produces the output signal v of LO voltage when the output signal u from the AND circuit 15 has H1 voltage relative to the output signal p from the laser power detection circuit 11. Thus, since the output signal u from the AND circuit 15 is H1 voltage at the retardation defect j4, the masking circuit 19 produces output signal v of LO voltage. Since the laser drive circuit 21 continues to drive the laser-beam source 1 on the basis of this LO voltage, the laser-beam source 1 can be prevented from being stopped even when the retardation defect occurs.

On the contrary, when the abnormal beam emission occurs, the amount of the signal m from the irradiation beam photo detector 10 is changed to exceed 1.5 mW, and the laser power detection circuit 11 produces the output signal p of the same H1 voltage as at the retardation defect j4 as shown in FIG. 11B.

On the other hand, since the amount of the beam from laser-beam source 1 and the amount of the reflected beam are normally changed in proportion to each other on the correct area of optical disk 6, the amount of the reflected beam to the envelope detection circuit 23 increases to exceed the slice levels f5, f6, the envelop detection circuit 23 produces output signal h4 of LO voltage. Thus, as a result of taking the product of the input voltages by the AND circuit, the output signal u becomes LO voltage. Consequently, the masking circuit 19 allows the H1 voltage from the laser power detection circuit 11 to be produced from the masking circuit 19 as output signal v. Therefore, the laser drive circuit 21 drives the laser-beam source 1 to stop on the basis of this H1 voltage, so that the laser-beam source stops its beam emission.

In other words, by using the change of the signal m from the irradiation beam photo detector 10 and the change of the signal k from the reproducing photo detector 8, it is possible to precisely detect the retardation defect that has so far been hard to detect by only the reproducing photo detector 8. Therefore, the output signal v from the masking circuit 19 is used as a laser-beam emission-stopping signal, and the laser drive circuit 21 is controlled in its driving operation by this laser-beam emission-stopping signal, so that the laser-beam source 1 can be prevented from being stopped in its beam emission at the retardation defect but can be instantly stopped when the abnormal beam emission occurs. Thus, the data on the disk can be prevented from being destroyed by the abnormal beam emission of 20-□S duration as described in the above first embodiment.

Since the laser-beam source 1 never stops its beam emission under this construction even when the retardation defect often occurs, the data can be stably reproduced from the disk. Particularly when data is reproduced in a time-series manner as in the stream reproduction of image files, the reproduced image becomes hard to interrupt.

Moreover, when the amount of the beam from the laser-beam source 1 is processed to reduce by an arbitrary amount during the interval in which the output signal u from the AND circuit 15 takes the H1 voltage or when the angle of the quarter wave plate 4 is changed during the H1-voltage period so that the amount of beam to the irradiation beam photo detector 10 can be a predetermined value, the laser-beam source 1 can be prevented from being stopped without damage to the data even when the duration of the retardation defect j4 exceeds 20 □S.

Although we have mentioned about data reproduction technique associated with the retardation defect, this invention is not limited to the retardation defect, but can be apparently applied to other defects where the reflected beam detected by the reproducing photo detector is not changed due to other factors.

The constructions of the defect detection circuits mentioned above are only examples. Other circuit arrangements different from those mentioned above can be of course included within the scope of the invention as long as they can detect the defects where the change of the reflected beam is hard to appear.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An optical disk apparatus comprising:
   a laser beam source;
   a driving circuit which drives said laser beam source which irradiates a laser beam onto an optical disk;
   an irradiation beam photo detector which produces an amount-of-irradiation-beam detection signal in accordance with an amount of said laser beam irradiated from said laser-beam source;

a reflection beam photo detector which produces an amount-of-reflection-beam detection signal in accordance with the amount of laser beam reflected from the optical disk;

a period detector which detects whether a period during which a voltage of the amount-of-irradiation-beam detection signal is larger than a predetermined value is shorter than a predetermined period;

a beam splitter which directs the laser beam irradiated from said laser beam source onto the optical disk and directs the laser beam reflected from the optical disk to said reflection beam photo detector, wherein, when said period detector detects that that the period during which the voltage of the amount-of-irradiation-beam detection signal is larger than the predetermined value is shorter than the predetermined period, then said laser beam source is being driven by said drive circuit.

2. An optical disk apparatus according to claim 1, wherein when the period during which the voltage of the amount-of-irradiation-beam detection signal is larger than the predetermined value is longer than the predetermined period, then driving of said laser beam source is stopped.

3. An optical disk apparatus according to claim 1, wherein when the voltage of the amount-of-irradiation-beam detection signal is larger than the predetermined value, and amplitude of the amount-of-reflection-beam detection signal is larger than the predetermined value, then driving of said laser beam source is stopped.

4. A data reproducing method of carrying out an optical disk apparatus including a laser beam source, a drive circuit for driving said laser beam source which irradiates a laser beam onto an optical disk, an irradiation beam photo detector which produces an amount-of-irradiation-beam detection signal in accordance with an amount of said laser beam irradiated from said laser-beam source, a reflection beam photo detector which produces an amount-of-reflection-beam detection signal in accordance with the amount of laser beam reflected from the optical disk, a period detector which detects whether a period during which a voltage of the amount-of-irradiation-beam detection signal is larger than a predetermined value is shorter than a predetermined period, and a beam splitter which directs the laser beam irradiated from said laser beam source onto the optical disk and directs the laser beam reflected from the optical disk to said reflection beam photo detector, comprising the steps of:

producing the amount-of-irradiation-beam detection signal in accordance with the amount of laser beam from said laser beam source; and when the period during which the voltage of the amount-of-irradiation-beam detection signal is larger than the predetermined value is shorter than the predetermined period, irradiating said laser beam on the optical disk.

5. A data reproducing method according to claim 4, further comprising:

when the period during which the voltage of the amount-of-irradiation-beam detection signal is larger than the predetermined value is longer than the predetermined period, stopping irradiation of the laser beam.

6. An optical disk apparatus comprising:
a laser beam source;

a drive circuit which drives said laser-beam source which irradiates a laser beam onto an optical disk;

an irradiation beam photo detector which produces an amount-of-irradiation-beam detection signal in accordance with an amount of said laser beam irradiated from said laser-beam source;

a reflection beam photo detector which produces an amount-of-reflection-beam detection signal in accordance with the amount of laser beam reflected from the optical disk;

a voltage detector which detects whether a voltage of the amount-of-irradiation-beam detection signal is larger than a predetermined voltage value;

an amplitude detector which detects whether an amplitude of the amount-of-reflection-beam detection signal is smaller than a predetermined amplitude value; and a beam splitter which directs the laser beam irradiated from said laser beam source onto the optical disk and directs the laser beam reflected from the optical disk to said reflection beam photo detector, wherein, when the voltage of the amount-of-irradiation-beam detection signal is larger than the predetermined voltage value, and the amplitude of the amount-of-reflection-beam detection signal is smaller than the predetermined amplitude value, then said laser beam source being driven by said driving circuit.

7. A data reproducing method of carrying out an optical disk apparatus including a laser beam source, a drive circuit for driving said laser beam source which irradiates a laser beam onto an optical disk, an irradiation beam photo detector which produces an amount-of-irradiation-beam detection signal in accordance with an amount of said laser beam irradiated from said laser-beam source, a reflection beam photo detector which produces an amount-of-reflection-beam detection signal in accordance with the amount of laser beam reflected from the optical disk, a voltage detector which detects whether a voltage of the amount-of-irradiation-beam detection signal is larger than a predetermined voltage value, an amplitude detector which detects whether an amplitude of the amount-of-reflection-beam detection signal is smaller than a predetermined amplitude value, and a beam splitter which directs the laser beam irradiated from said laser beam source onto the optical disk and directs the laser beam reflected from the optical disk to said reflection beam photo detector, comprising the steps of:

producing the amount-of-reflection-beam detection signal in accordance with the amount of laser beam reflected from the optical disk, wherein when the voltage of the amount-of-irradiation-beam detection signal is larger than the predetermined voltage value, and the amplitude of the amount-of-reflection-beam detection signal is smaller than the predetermined amplitude value, then said laser beam is being irradiated.

8. A data reproducing method according to claim 7, wherein when the voltage of the amount-of-irradiation-beam detection signal is larger than the predetermined voltage value, and the amplitude of the amount-of-reflection-beam detection signal is larger than the predetermined amplitude value, then irradiation of said laser beam is stopped.

* * * * *